Feb. 21, 1928.
E. L. HOWELL
1,659,916
LUBRICATOR TERMINAL CHECK VALVE
Filed Jan. 11, 1927
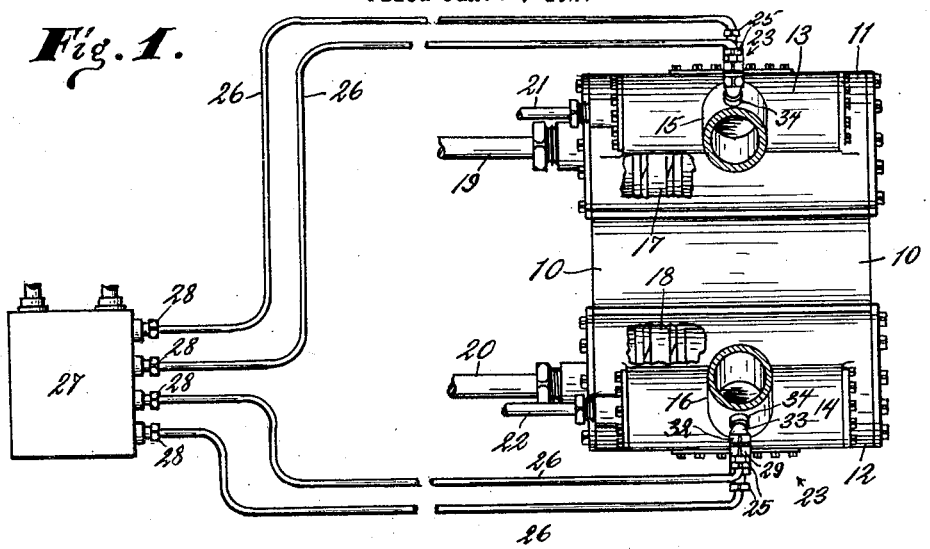
Inventor.
Ernest L. Howell.
by
Lockwood & Lockwood
His Attorneys.

Patented Feb. 21, 1928.

1,659,916

UNITED STATES PATENT OFFICE.

ERNEST L. HOWELL, OF LAS VEGAS, NEVADA.

LUBRICATOR-TERMINAL CHECK VALVE.

Application filed January 11, 1927. Serial No. 160,505.

This invention relates to terminal check valves for lubricating the cylinders and pistons of steam locomotives, and an object thereof is to provide a simple means which, in addition to being economical in the use of lubricant, will also be effective in positively supplying a sufficient amount of lubricant to the cylinders and pistons to keep them in operative order. As is well known, locomotives have their pistons operating in exact time with one another. That is, the cranks for operating the pistons are secured to or integral with the drive shaft so that both pistons must move substantially in the same time; and if, for any reason, one of the cylinders becomes hot and causes a piston to stick or move, in retarded time, then the machine will be twisted, or broken; and if broken, there is the liability of a wreck common to railroads. The importance of proper lubrication of locomotive cylinders and slide valves cannot be too greatly emphasized.

Various means have been employed heretofore for lubricating slide valves and cylinders, but they are defective for the reason that the gummy substance of the lubricant has clogged the passages which heretofore have been blocked by fine mesh screens and tortuous turns; and an object of this invention is to provide a simple means for lubricating the slide valves and cylinder of locomotives without danger of the passages becoming clogged; and to that end I provide an appliance with relatively straight passages that are not blocked by screens or other like impediments.

Another object of the invention is to provide a terminal check valve for locomotive engines that can be easily tested to determine that it is operative.

Another object of the invention is to provide a lubricating appliance for locomotives that has its fuel passages axially aligned and connected by by-passes only slightly out of axial alignment so that abrupt tortuous passages that are liable to accumulate gummy residue of the lubricant are avoided.

Another object is to provide a terminal check valve for locomotives comprising four parts that are of a substantial character and axially aligned, and not liable to become defective on account of delicacy of construction.

Features of invention are shown in the construction and operation of the valve and means for by-passing the lubricant around it.

Other objects, advantages and features of invention may appear from the accompanying drawings, the detailed description and the appended claims.

The accompanying drawings illustrate the appliance, in which:

Figure 1 is a fragmentary sectional plan view of a locomotive engine saddle with lubricating appliances connected thereto and also showing diagrammatically a lubricator pump and pipe connections to the appliances, the engine being omitted for the sake of clearness in the drawings.

Fig. 2 is a central longitudinal section through the appliance attached to a fragmental portion of a cylinder in which a portion of a piston is shown.

Fig. 3 is a sectional view analogous to Fig. 2 with the valve casing moved endwise from the housing to release the spring and loosen the valve so that residue of oil can be blown out of the appliance.

Fig. 4 is an enlarged end view of the valve casing showing the valve seat, the guides for the valve, and the by-pass passages around the valve seat.

Fig. 5 is a fragmental section on line 5—5 of Fig. 4, with parts on a reduced scale showing the guides engaging the valve;

Fig. 6 is an enlarged cross section on line 6—6 of Fig. 3, showing the guides engaging the valve and by-passes around it.

Fig. 7 is a view of the valve removed from the casing. The parts shown in Figs. 4, 6 and 7 are about actual size.

In Fig. 1 a plan view of a locomotive saddle 10 is shown to which is secured cylinders 11 and 12 with slide valve housings 13 and 14; and integral with the housings 13 and 14 are steam pipes 15 and 16 that receive steam from the locomotive boiler in the usual way. The cylinders 11 and 12 are provided with pistons 17—18 of usual construction which are connected by piston rods 19—20 to cross heads not shown but which are well understood in the art.

As has been previously stated the piston rods 19—20 are driven by cranks on the engine drive shafts and they must move in exact time with one another. This also is true of the eccentric rods 21—22 that shift the slide valve in the housings 13 and 14. In other words the slide valves and pistons must move in exact time with one another. The sticking of a slide valve or cylinder will cause a bending or breaking of some parts that may cause a wreck, and for that reason special attention must be paid to the lubrication of cylinders and shift valves.

A lubricating appliance 23 shown in detail in the drawing is secured to each of the cylinders 11 and 12 and also one to each of the steam pipes 15 and 16 and these appliances are constructed and operated substantially alike. Each is provided with an elongated partly threaded pipe connection 24 for clamp nuts 25 for securing the discharge ends of copper feed pipes 26 thereto. The copper pipes are extended to a lubricator 27 and have their other ends secured thereto by clamp nuts 28 as semi-diagrammatically indicated in Fig. 1. The lubricator pump 27 diagrammatically shown in Fig. 1 is operated in a well known way to drive lubricant through the valve 23 at a pressure in excess of the pressure supplied to the steam entering the slide valve housings and cylinders. The mechanism and operation of the lubricator are old and well understood, and for brevity are not shown or described in detail.

The pipe connection 24 is integral with a valve casing 29 that is provided with a threaded extension 30 adapted to be screwed into a socket 31 in a spring housing 32. This housing is provided with an elongated partly threaded extension 33 that can be screwed into bosses 34 on cylinders 11—12 and steam pipes 15—16. The valve casing 29 has an irregular bore that is formed by first drilling four by-passes 35 that are of equal diameter and spaced an equal distance apart and an equal distance from the longitudinal center of the casing, and then a drill of larger diameter is used to cut out a portion of the center of the casing 29 to form a center bore 36 of sufficient size and depth for the valve 37. This bore 36 has a diameter that cuts through all of the centers of the by-passes 35; and the bore 36 is slightly larger than the check valve 37 so that when it is heated to a high temperature it will not stick between the guides 38 that are incidentally formed by the drilling of by-passes 35 and 36. The by-passes 35 are drilled to a greater depth in the casing 29 than the center bore 36 and at the terminating point of the bore 36 the center portion of the casing is drilled into a raised concave valve seat 39; and a passageway 40 is drilled centrally in the valve seat and longitudinally through the casing 29 through which the lubricant can pass. The check valve 37 is provided with a concave point 41 that is an exact fit into the raised convexed valve seat 39 so that when it is seated no fluid can pass therethrough. The purpose of this valve is to choke the passage through the appliance so that only a predetermined amount of lubricant under a pressure can pass therethrough. The valve is provided with an elongated stem 42 that extends outward a sufficient distance from the extension 31 to be grasped by the fingers of an operator or with tools for grinding the point 41 into the valve seat 39. In other words, when the casing 29 is removed from the housing 32 an operator can grasp the extending stem 42 with his fingers and spin it around a number of times on the seat 39 so as to remove any foreign substance that has adhered thereto or remove any unevenness in the seat. The spring housing 32 is provided with a centerbore of three varied diameters aligned that form the threaded socket 31, a spring seat 43, against one end of which a spring 44 is adapted to be seated and a lubricant passage 46. The other end of the spring 44 engages the shoulder 45 on the check valve 37; and tension is applied to the spring by screwing the valve casing 29 into the socket 31 of the housing 32. The housing 32 as stated is provided with a passage 46 that is axially aligned with the bore 38 and passage 40 through which the lubricant can be discharged into the steam pipes or cylinders of a locomotive. The extensions 24 and 33 are provided with unthreaded portions which can be threaded in the event the appliance becomes worn and needs a new turn or two of the threads to make the parts secure against leakage. In other words, assuming that the threaded portion of the parts 24 and 33 have become badly worn so that they leak; then the parts 32 and 29 can be placed in a vise and additional threads added to the connections 24 and 33 to make them impervious to leakage. This is an important feature in the construction of the appliance as heretofore no provision has been made for such an emergency construction. In other words, assuming that an engine is far out from a repair shop and a lubricating appliance becomes defective through leakage, then the parts can be taken apart and threaded further to remedy the defect.

Also in the construction of the valve casing 29 the by-passes 35 are drilled a considerable distance below the valve seat 39, so that as the valve seat is worn it can be drilled down without affecting the by-pass. Also considerable metal is left between the pipe connection 24 and the bottom of the holes 35 so that if need be the holes 35 can be deepened to provide additional metal for the valve seat.

In operation an appliance such as described and shown in detail in Figs. 2 to 7 inclusive is secured to each of the cylinders of a locomotive and also to each of the steam pipes 15 and 16, as diagrammatically indicated in Fig. 1. The casing 29 is screwed into the housing 32 to apply tension to the spring 44 so it will hold the check valve 37 seated to resist a pressure in the passage 41 that is in excess of the steam pressure in the steam pipes and cylinders of the locomotive.

When the parts are installed and the locomotive is in operation the lubricator pump 27 is actuated in a well known way to force lubricant through the pipes 26 into passages 40 to unseat the check valve 37 and permit the lubricant to enter the by-passes 35 and pass through the springs 44 and passages 46 into the steam pipes and cylinders of a locomotive to lubricate them.

To cleanse and test the appliances after they have been in operation, they are disconnected from the locomotive; and then the pipe connections 24 are attached to a blower apparatus with a steam pressure sufficient to unseat the check valve 37 and clear out the passages. If the steam from the blowers passes freely through the appliances it can be safely reattached to the locomotive without disconnecting the casing 29 from the housing 32.

In the event the steam does not pass freely through the appliance the casing 29 can be slightly unscrewed from the housing 32 to release the pressure of the spring 44 on the choke valve 37, after which a discharge of steam therethrough will cleanse all foreign substance from the passages, seat, valve and spring. In the event, however, that it is not thoroughly cleansed by the aforementioned means, the parts can be easily disconnected, cleansed and reassembled. By this construction great time is saved in the installation as well as in the testing and cleansing of these appliances, and they are positive in their action and free from parts that would unnecessarily accumulate the gummy residue of lubricant.

I claim as my invention:—

1. A four-piece terminal check valve construction including a housing having a lubricant passage therethrough; a casing adapted to be attached end to end to said housing, said casing having a lubricant passage therethrough that is axially aligned with the passage through said housing; and means axially aligned with said housing and casing for choking and normally closing the passage through said casing.

2. A four-piece terminal check valve construction for lubricating the slide valves and cylinders of locomotives including a housing adapted to be attached to the locomotive; a casing adapted to be attached end to end to said housing, said casing and housing having longitudinal passages therethrough; a check valve in said casing that is adapted to be opened by fluid pressure to permit lubricant to pass by said check valve; and a spring for normally holding said check valve closed, said parts being arranged in axial alignment.

3. A four-piece terminal check valve construction for lubricating the slide valve and cylinders of locomotives, including a housing adapted to be attached to a locomotive, said housing having a center bore of three varied diameters forming a screw socket, a spring seat, and a small lubricant passage; a casing having a large center longitudinal bore therein terminating in a small lubricant passage axially aligned with the bore through said housing; a valve seat at the terminal end of the large bore of said casing; a check valve in the large bore of said casing that is adapted to be moved longitudinally of the casing by fluid pressure to open the small lubricant passage; means for by-passing lubricant around the check valve when it is in open position; and a spring for normally holding said check valve closed.

4. A terminal check valve construction for lubricating the slide valves and cylinders of locomotives including a housing adapted to be attached to a locomotive and having a small lubricant passage therethrough; a casing attached to said housing that has a large center bore therein that is axially aligned with a small lubricant passage therethrough, in said casing having by-passes that are spaced equi-distant apart and an equal distance from the center of said casing, and are cut into by the large center bore, said by-passes extending longitudinally with the large bore of the casing and in communication therewith; a valve seat at the terminal end of the large bore; a check valve in the large bore that is adapted to be opened by fluid pressure; and a spring for normally holding said check valve in engagement with said seat to close the lubricant passage.

5. A terminal check valve construction including a housing having a threaded socket and a spring seat therein and a lubricant passage therethrough axially aligned and of varied diameter; a casing adapted to be screwed into the socket of said housing, said casing having a center bore therein and a lubricant passage therethrough that are axially aligned with the passage through said housing; a valve seat at the terminal end of the center bore in said casing that has a convexed surface; a check valve in the center bore that has a concave end adapted to fit into the convexed valve seat; a shoulder on said choke valve; a spring having its ends engaging the spring seat in said housing and the shoulder on said slide valve; and spaced by-passes parallel with and cut into by the large center bore for by-passing lubricant around said check valve when it is forced into open position.

6. A terminal check valve construction including a housing having a threaded socket and a spring seat therein and a lubricant passage therethrough; a casing adapted to be screwed into the socket of said housing, said casing having a center bore therein and a lubricant passage therethrough that are axially aligned with the passage through said housing; by-passes in said casing that are parallel to the center bore and that extend into the casing a greater depth than the center bore thereof; a valve seat having a convexed surface at the terminal end of the center bore; a check valve having a concave end adapted to fit into said valve seat, said valve adapted to open by fluid pressure; a shoulder on said valve; and a spring having ends engaging the spring seat in said housing and the shoulder on said valve so as to yieldingly choke the passage through said casing.

7. A terminal check valve including a housing; an extension integral with said housing that is partly threaded; a casing adjustably connected to said housing; a pipe connection integral with said casing that is partly threaded, said extension and connection elongated so that additional threads can be added thereto when necessary; axially aligned lubricant passages extending longitudinally through said connection, casing, housing and extension; and yielding means within said housing and casing for choking the passage through said casing.

In witness whereof, I have hereunto affixed my signature.

ERNEST L. HOWELL.